L. MILLER.

Harvester-Rakes.

No. 8,565. Reissued Feb. 4, 1879.

*Witnesses:*

John Everding

W. C. Strawbridge

*Inventor:*

Lewis Miller

N. PETERS, PHOTO-LITHOGRAPHER, WASHINGTON, D. C.

UNITED STATES PATENT OFFICE.

LEWIS MILLER, OF AKRON, OHIO.

IMPROVEMENT IN HARVESTER-RAKES.

Specification forming part of Letters Patent No. 65,106, dated May 28, 1867; Reissue No. 8,565, dated February 4, 1879; application filed March 14, 1877.

*To all whom it may concern:*

Be it known that I, LEWIS MILLER, of Akron, in the county of Summit and State of Ohio, have invented certain new and useful Improvements in Operating Rakes on Harvesting-Machines; and I do hereby declare the following to be a full, clear, and exact description of the same, reference being had to the accompanying drawings, making a part of this specification, in which—

Figure 1:
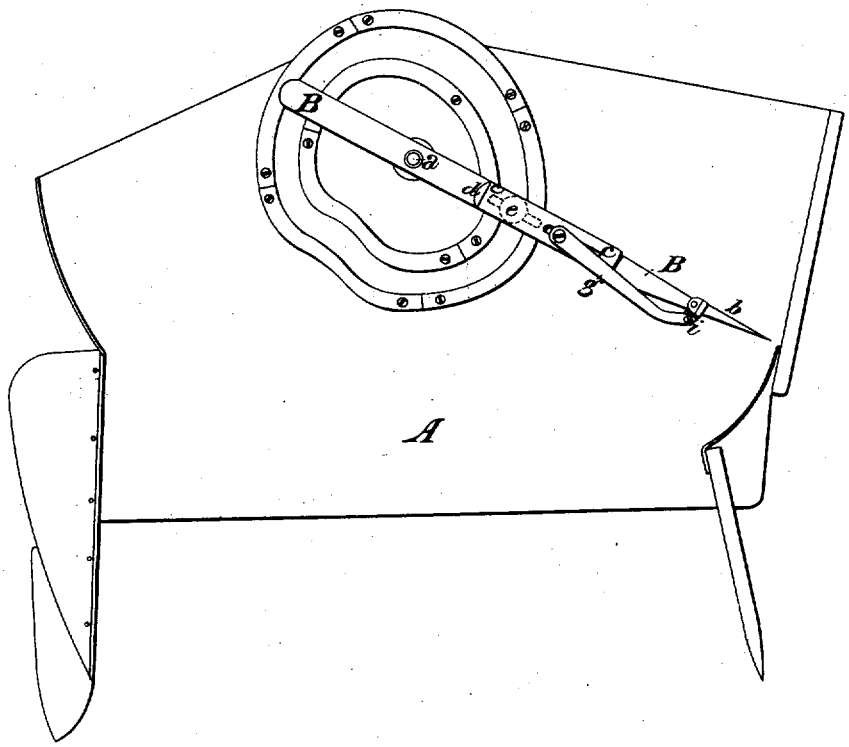
Figure 2:
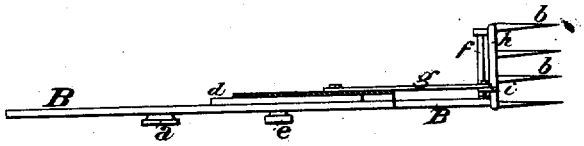

Figure 1 represents a platform or grain-table of a harvesting-machine, with the rake or fork and the appliances for operating it thereon. Fig. 2 represents a sectional elevation of the rake or fork removed from the platform.

Similar letters of reference, where they occur in the separate figures, denote like parts of the machine in both.

This invention consists in certain mechanism for turning the rake or fork upon its arm as the latter is revolved in a regular path over the platform, to cause it (the fork) to properly enter the grain, and then move parallel, or nearly so, along the front of the platform, then turn and properly deliver the gavel upon the ground.

To enable others skilled in the art to make and use my invention, I will proceed to describe the same with reference to the drawings.

The platform A may be of the irregular shape shown, having greater length than depth of sides, and neither sides nor ends parallel, so that a rake, in sweeping such a platform of the cut grain upon it, must have a correspondingly irregular motion to travel or move parallel with its sides and ends, or nearly so. On this platform is hung an arm, B, so that it may be moved around a fixed point, as at *a*, by any suitable gearing and appliances connecting it with the driving-gear of the harvesting-machine. This arm B has a uniform circular motion; but the rake or fork *b*, upon its extreme outer end, has a variable motion, as follows: Within a guide or shield, *c*, on the arm B there is a sliding piece, *d*, which is moved out and in by the roller-guide *e* following the cam-path C.

The rake or fork is pivoted to an upright post, *f*, fixed permanently in the outer end of the arm B, and a connecting rod or bar is pivoted by one of its ends to the slide *d*, and by its other end to a projecting arm, *i*, on the rake or fork-head *h*, so that as the slide is moved out or in by the guide-roller and cam-track it turns the rake or fork upon its post, and thus gives it the proper position for entering, sweeping around, and delivering of the gavel upon the ground, and the cam-track at the same time receives the pressure of the rake due to the resistance or weight of the grain which is being removed.

The cam-path and arm may be protected by an upper or supplemental grain-table, to prevent the straw from being drawn into and interfering with their free motion.

Having thus fully described my invention, what I claim therein as new, and desire to secure by Letters Patent, is—

1. A centrally-pivoted rake-arm, a rake or fork pivoted to the outer end thereof, and a camway positively controlling the angle between the rake-arm and rake-fork in entering, sweeping around, and delivering the gavel upon the ground, substantially as shown and described.

2. In combination with a revolving arm carrying a pivoted rake or fork upon its outer end, a slide and connecting-rod that is operated by a cam and guide, and attached to said rake or fork, so that while the arm moves in a true circle the rake or fork may assume different positions upon it, substantially as and for the purpose described.

LEWIS MILLER.

Witnesses:

N. N. LEOHNER,

S. P. WALLACE.